(12) United States Patent
Wohlfeld

(10) Patent No.: US 12,536,786 B2
(45) Date of Patent: Jan. 27, 2026

(54) IMAGE LOCALIZATION USING A DIGITAL TWIN REPRESENTATION OF AN ENVIRONMENT

(71) Applicant: FARO Technologies, Inc., Lake Mary, FL (US)

(72) Inventor: Denis Wohlfeld, Ludwigsburg (DE)

(73) Assignee: FARO Technologies, Inc., Lake Mary, FL (US)

( * ) Notice: Subject to any disclaimer, the term of this patent is extended or adjusted under 35 U.S.C. 154(b) by 408 days.

(21) Appl. No.: 18/337,878

(22) Filed: Jun. 20, 2023

(65) Prior Publication Data

US 2023/0419650 A1 Dec. 28, 2023

Related U.S. Application Data

(60) Provisional application No. 63/354,928, filed on Jun. 23, 2022.

(51) Int. Cl.
*G06V 10/82* (2022.01)
*G06F 30/13* (2020.01)
(Continued)

(52) U.S. Cl.
CPC .............. *G06V 10/82* (2022.01); *G06F 30/13* (2020.01); *G06T 3/14* (2024.01); *G06T 7/246* (2017.01);
(Continued)

(58) Field of Classification Search
CPC .......... G06N 20/00; G06N 3/02; G06F 30/13; G06F 30/12; G06F 30/392; G06F 30/398; G06F 30/27; G06F 18/21; G06F 18/213; G06F 3/011; G06V 10/82; G06V 10/44; G06V 20/176; G06V 10/7715; G06V 10/70; G06V 10/757; G06V 10/754; G06V 30/414; G06V 10/771; G06V 10/77; G06V 10/462; G06V 10/46; G06V 10/464; G06V 10/467; G06V 10/24; G06V 10/242;
(Continued)

(56) References Cited

U.S. PATENT DOCUMENTS

2022/0319120 A1* 10/2022 Ponjou Tasse ........ G06T 19/006
2023/0032888 A1* 2/2023 Li .......................... G06V 10/44
(Continued)

*Primary Examiner* — Henok Shiferaw
*Assistant Examiner* — Dennis Rosario
(74) *Attorney, Agent, or Firm* — McCarter & English, LLP; Dave S. Christensen

(57) ABSTRACT

Examples described herein provide a method that includes capturing, using a camera, a first image of an environment. The method further includes performing, by a processing system, a first positioning to establish a position of the first image in a layout of the environment. The method further includes detecting, by the processing system, a feature in the first image. The method further includes performing, by the processing system, a second positioning based at least in part on the feature to refine the position of the first image in the layout. The method further includes capturing, using the camera, a second image of the environment and automatically registering the second image to the layout. The method further includes generating a digital twin representation of the environment using the first image based at least in part on the refined position of the first image in the layout and using the second image.

20 Claims, 9 Drawing Sheets

(51) Int. Cl.
  *G06T 3/14* (2024.01)
  *G06T 7/246* (2017.01)
  *G06T 7/30* (2017.01)
  *G06T 7/33* (2017.01)
  *G06T 7/38* (2017.01)
  *G06T 7/70* (2017.01)
  *G06T 7/73* (2017.01)
  *G06T 11/20* (2006.01)
  *G06T 15/20* (2011.01)
  *G06V 10/764* (2022.01)
  *G06V 10/77* (2022.01)
  *G06V 20/10* (2022.01)
  *G06V 20/40* (2022.01)

(52) U.S. Cl.
  CPC ............... *G06T 7/30* (2017.01); *G06T 7/33* (2017.01); *G06T 7/38* (2017.01); *G06T 7/70* (2017.01); *G06T 7/73* (2017.01); *G06T 11/20* (2013.01); *G06T 11/206* (2013.01); *G06T 15/205* (2013.01); *G06V 10/764* (2022.01); *G06V 10/7715* (2022.01); *G06V 20/176* (2022.01); *G06V 20/47* (2022.01); *G06T 2210/04* (2013.01); *G06T 2211/00* (2013.01); *G06T 2215/16* (2013.01)

(58) Field of Classification Search
  CPC .. G06V 10/243; G06V 10/245; G06V 10/248; G06V 10/247; G06V 10/16; G06V 10/42; G06V 10/40; G06V 30/412; G06V 10/764; G06V 20/70; G06V 20/20; G06V 10/758; G06V 10/72; G06V 10/74; G06V 10/75; G06V 20/46; G06V 20/47; G06T 2207/20084; G06T 2207/20081; G06T 7/0004; G06T 2210/04; G06T 2219/2016; G06T 7/246; G06T 7/73; G06T 7/30; G06T 7/32; G06T 7/337; G06T 7/344; G06T 7/35; G06T 7/37; G06T 2219/2004; G06T 5/60; G06T 11/00; G06T 17/20; G06T 2200/00; G06T 2200/04; G06T 2200/08; G06T 2200/21; G06T 2200/24; G06T 2200/32; G06T 2210/00; G06T 2210/61; G06T 2211/00; G06T 2211/441; G06T 11/001; G06T 3/14; G06T 3/147; G06T 3/153; G06T 7/38; G06T 19/006; G06T 7/70; G06T 7/74; G06T 7/75; G06T 7/77; G06T 2207/30108; G06T 3/60; G06T 19/20; G06T 2207/30244; G06T 19/00; G06T 15/20; G06T 15/205; G06T 11/206; G06T 11/20; G06T 2215/16; G06T 15/00; G06T 7/33; G06T 19/003; A61B 2090/365; B64U 2101/30; H04N 5/272; G05D 2107/40; G05D 2107/00; G05D 2107/50; G05D 2107/60; G05D 2107/63; G05D 2107/67; G05D 2107/65; G05D 2107/68; G05D 2107/70; G05D 2107/73; G05D 2107/75; G05D 2107/80; G05D 2107/82; G05D 2107/84; G05D 2107/85; G05D 2107/87; G05D 2107/90; G05D 2107/95

See application file for complete search history.

(56) References Cited

U.S. PATENT DOCUMENTS

| | | | |
|---|---|---|---|
| 2023/0125295 A1* | 4/2023 | Min | G06T 7/74 701/25 |
| 2023/0326098 A1* | 10/2023 | Zweigle | G06T 7/60 382/284 |

* cited by examiner

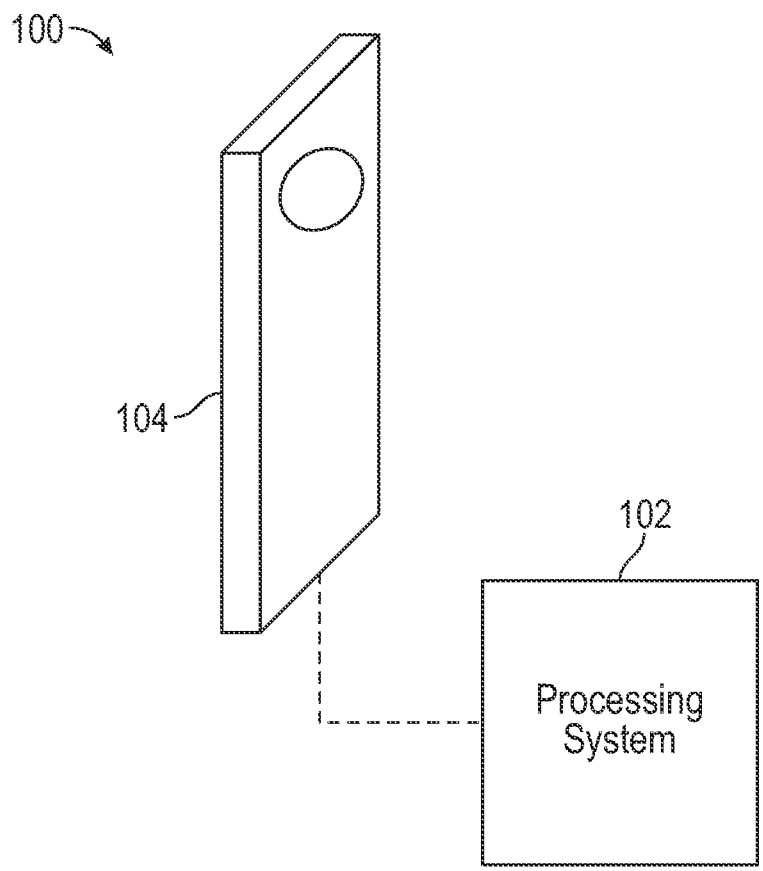
FIG. 1A
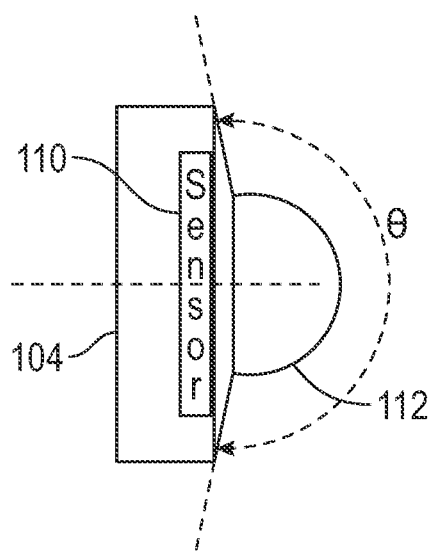
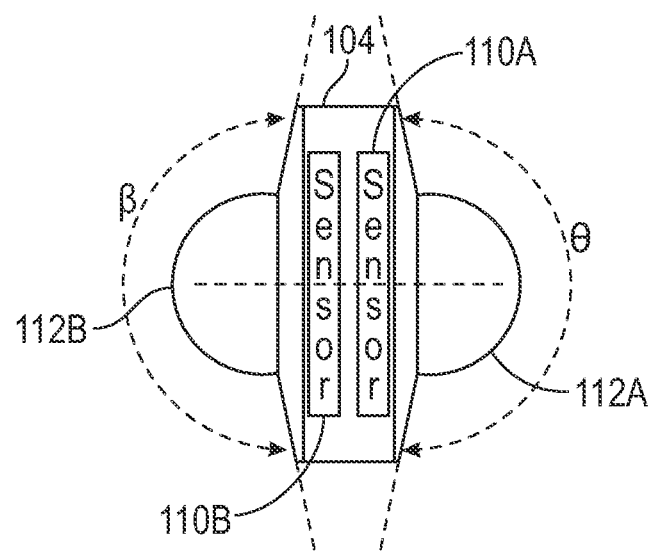
FIG. 1B
FIG. 1C

IMAGE LOCALIZATION USING A DIGITAL TWIN REPRESENTATION OF AN ENVIRONMENT

CROSS-REFERENCE TO RELATED APPLICATIONS

This application claims the benefit of U.S. Provisional Patent Application No. 63/354,928, entitled "IMAGE LOCALIZATION USING A DIGITAL TWIN REPRESENTATION OF AN ENVIRONMENT" filed Jun. 23, 2022, which is incorporated by reference herein in its entirety.

BACKGROUND

The subject matter disclosed herein relates to digital twins, and in particular to image localization using a digital twin representation of an environment.

A digital twin is a virtual representation (or "twin") of a physical thing, such as an object, system, environment, and/or the like. Digital twins can be used to virtually represent vehicles, boats/ships, industrial machines, buildings, and/or any other suitable physical object or environment (individually and/or collectively referred to as a "physical object"). Digital twins are created by capturing data about the physical objects. The data can include three-dimensional (3D) coordinate data and/or image data. The 3D coordinate data be captured by a 3D coordinate measurement device (such as a 3D laser scanner time-of-flight (TOF) coordinate measurement device, a light detection and ranging (LIDAR) device, etc.), a mobile mapping device, and/or the like, including combinations and/or multiples thereof. The image data can be captured by any suitable imaging device, such as a digital camera.

Once created, digital twins are useful for analyzing a physical object, such as an environment, so that it can be better understood. For example, an action can be simulated using the digital twin to evaluate how such action may affect the physical object. As other examples, digital twins are useful for visualizing an object and/or environment, evaluating how multiple objects and/or environments work together, troubleshooting an object, and/or the like including combinations and/or multiples thereof.

While existing digital twin generation techniques are suitable for their intended purposes the need for improvement remains, particularly in providing a system and method having the features described herein.

BRIEF DESCRIPTION

According to an embodiment, a method is provided. The method includes capturing, using a camera, a first image of an environment, the camera being communicatively connected to a processing system. The method further includes performing, by the processing system, a first positioning to establish a position of the first image in a layout plan of the environment. The method further includes detecting, by the processing system, a feature in the first image. The method further includes performing, by the processing system, a second positioning based at least in part on the feature to refine the position of the first image in the layout plan of the environment. The method further includes capturing, using the camera, a second image of the environment. The method further includes automatically registering the second image to the layout plan. The method further includes generating a digital twin representation of the environment using the first image based at least in part on the refined position of the first image in the layout plan of the environment and using the second image.

In addition to one or more of the features described herein, or as an alternative, further embodiments of the method may include that the camera is a 360 degree image acquisition system.

In addition to one or more of the features described herein, or as an alternative, further embodiments of the method may include that the 360 degree image acquisition system includes: a first photosensitive array operably coupled to a first lens, the first lens having a first optical axis in a first direction, the first lens being configured to provide a first field of view greater than 180 degrees; a second photosensitive array operably coupled to a second lens, the second lens having a second optical axis in a second direction, the second direction is opposite the first direction, the second lens being configured to provide a second field of view greater than 180 degrees; and wherein the first field of view at least partially overlaps with the second field of view.

In addition to one or more of the features described herein, or as an alternative, further embodiments of the method may include that the first optical axis and second optical axis are coaxial.

In addition to one or more of the features described herein, or as an alternative, further embodiments of the method may include that the first photosensitive array is positioned adjacent the second photosensitive array.

In addition to one or more of the features described herein, or as an alternative, further embodiments of the method may include that the processing system triggers the camera to capture the first image with a trigger event.

In addition to one or more of the features described herein, or as an alternative, further embodiments of the method may include that the trigger event is an automatic trigger event or a manual trigger event.

In addition to one or more of the features described herein, or as an alternative, further embodiments of the method may include that the automatic trigger event is based on a location of the processing system, is based on a location of the camera, is based on an elapsed distance, or is based on an elapsed time.

In addition to one or more of the features described herein, or as an alternative, further embodiments of the method may include that the first image is a first panoramic image.

In addition to one or more of the features described herein, or as an alternative, further embodiments of the method may include that the first image is a 360 degree image.

In addition to one or more of the features described herein, or as an alternative, further embodiments of the method may include that the feature is selected from the group consisting of a wall, a window, a door, and a door opening.

In addition to one or more of the features described herein, or as an alternative, further embodiments of the method may include that the feature is a window, and wherein the window is detected based on a first brightness value of a first pixel of the first image associated with the window compared to a second brightness value of a second pixel of the first image associated with other than the window.

In addition to one or more of the features described herein, or as an alternative, further embodiments of the method may include that detecting the feature is performed using a trained machine learning model.

In addition to one or more of the features described herein, or as an alternative, further embodiments of the method may include that the trained machine learning model is a convolutional neural network trained to classify features in images.

In addition to one or more of the features described herein, or as an alternative, further embodiments of the method may include, prior to capturing the first image: creating a project for the environment, wherein the project includes the layout plan; and extracting information about the environment based at least in part on the layout plan.

In addition to one or more of the features described herein, or as an alternative, further embodiments of the method may include, prior to generating the digital twin representation of the environment: optimizing localization of the first image and the second image; and detecting a change to a time series and associating the change to the time series with the digital twin representation.

According to an embodiment a system includes a camera to capture images of an environment and a processing system communicatively coupled to the camera. The processing system includes a memory including computer readable instructions. The processing system further includes a processing device for executing the computer readable instructions, the computer readable instructions controlling the processing device to perform operations. The operations include causing the camera to capture a first image of the environment. The operations further include performing a first positioning to establish a position of the first image in a layout plan of the environment. The operations further include detecting a feature in the first image. The operations further include performing a second positioning based at least in part on the feature to refine the position of the first image in the layout plan of the environment. The operations further include generating a digital twin representation of the environment using the first image based at least in part on the refined position of the first image in the layout plan of the environment.

In addition to one or more of the features described herein, or as an alternative, further embodiments of the system may include that the operations further include: causing the camera to capture a second image of the environment; and automatically registering the second image to the layout plan, wherein the digital twin representation of the environment is generated further using the second image of the environment.

In addition to one or more of the features described herein, or as an alternative, further embodiments of the system may include a cloud computing system to: create a project for the environment, wherein the project includes the layout plan; extract information about the environment based at least in part on the layout plan; optimize localization of the first image and the second image; and detect a change to a time series and associating the change to the time series with the digital twin representation.

In addition to one or more of the features described herein, or as an alternative, further embodiments of the system may include that detecting the feature is performed using a trained machine learning model, and wherein the trained machine learning model is a convolutional neural network trained to classify features in the images.

The above features and advantages, and other features and advantages, of the disclosure are readily apparent from the following detailed description when taken in connection with the accompanying drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1A is a schematic block diagram of system to perform image localization using a digital twin representation of an environment, the system having a camera and a processing system according to one or more embodiments described herein;

FIG. 1B is a schematic view of an omnidirectional camera for use with the processing system of FIG. 1A according to one or more embodiments described herein;

FIG. 1C is a schematic view of an omnidirectional camera system with a dual camera for use with the processing system of FIG. 1A according to one or more embodiments described herein;

FIG. 1D' and FIG. 1E' are images of the dual camera of FIG. 1C where each of the images has a field of view greater than 180 degrees according to one or more embodiments described herein;

Figure 1D:
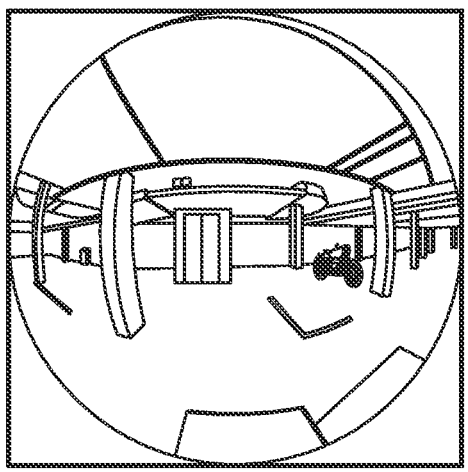
FIG. 1D and FIG. 1E are images acquired by the dual camera of FIG. 1C according to one or more embodiments described herein.

The detailed description explains embodiments of the disclosure, together with advantages and features, by way of example with reference to the drawings.

DETAILED DESCRIPTION

Embodiments of the present disclosure provide for using a camera, such as an ultra-wide angle camera for example, with a processing system to generate a digital twin representation of an environment or object.

Digital twins are created by capturing data about a physical thing, such as an object or objects in an environment. The data can include three-dimensional (3D) coordinate data and/or image data. The 3D coordinate data be captured by a 3D coordinate measurement device (such as a 3D laser scanner time-of-flight (TOF) coordinate measurement device, a light detection and ranging (LIDAR) device, a photogrammetry device, etc.), a mobile mapping device, and/or the like, including combinations and/or multiples thereof. The image data can be captured by any suitable imaging device, such as a digital camera.

Conventionally, digital twins are created using specialized hardware and trained personnel to generate a visually appealing digital twin, which offers at least a desired level of measurement capabilities. However, these digital twins are costly in terms of time and effort to make and complex in terms of the specialized hardware needed to generate them. For example, images of an environment are conventionally manually associated with relevant locations within a digital layout plan of the environment. This is a time consuming process and can be error prone. As an example, creating or updating a digital twin representation of a building requires multiple image captures in a first step, which are registered to the layout plan in a second step. Examples of use cases for a digital twin representation can include real estate, facilities management, contractor estimates, and/or the like, including combinations and/or multiples thereof.

In an effort to address these and other shortcomings of the prior art, one or more embodiments are provided herein for generating a digital twin representation of an environment or object using an ultra-wide angle camera to perform automatic registration. As an example, one or more embodiments described herein uses existing information from layout plans or other digital information to support image registration. By extracting features such as walls, doors, door openings, windows, window openings floor, and/or the like, including combinations and/or multiples thereof from the image, the image can be aligned to a layout plan. While conventional "xyz" alignment can be done manually, orientation is based on compass data and is less accurate. The techniques described herein improve conventional alignment by using features within captured images to perform alignment.

The one or more embodiments described herein eliminate the costly and complex specialized hardware and trained personnel conventionally needed to generate a digital twin representation of an object or environment. This can be accomplished by using consumer-grade hardware (e.g., a cellular-phone/smartphone and/or a panoramic camera) to generate a digital twin of an environment or object. For example, one or more embodiments described herein can be used to generate a virtual walkthrough of an environment. Such a virtual walkthrough provides not only panoramic images but also 3D geometry of the environment (e.g., a mesh from the recorded 3D point cloud data by the smartphone). As used herein, the phrase "point cloud" means a plurality of 3D coordinate data in a common frame of reference. This plurality of 3D coordinate data may be visually displayed as a collection of points.

Referring now to FIGS. 1A-1C, an embodiment is shown of a system 100 to perform image localization using a digital twin representation of an environment. Particularly, FIG. 1A depicts a system 100 to to perform image localization using a digital twin representation of an environment, the system 100 having a processing system 102 and a camera 104 according to one or more embodiments described herein. As an example, the processing system 102 can be a smartphone, laptop computer, tablet computer, and/or the like, including combinations and/or multiples thereof. As an example, the camera 104 can be an omnidirectional camera, such as the RICOH THETA camera. According to one or more embodiments described herein, the processing system 102 includes one or more sensors, such as an image sensor (e.g., camera), a light detecting and ranging (LIDAR) sensor (e.g., for measuring coordinates, such as three-dimensional coordinates, in an environment), an inertial measurement unit (IMU), and/or the like, including combinations and/or multiples thereof. In an embodiment where the processing system 102 includes a LIDAR sensor, the LIDAR sensor can include a light source and a light receiver. In such embodi-ments, the LIDAR sensor is configured to emit light from the light source, the light being reflected off a surface in the environment. The reflected light is received by the light receiver. In an embodiment, the light receiver of the LIDAR sensor is a photosensitive array.

The processing system 102 can be any suitable processing system, such as a smartphone, tablet computer, laptop or notebook computer, etc. Although not shown, the processing system 102 can include one or more additional components, such as a processor for executing instructions, a memory for storing instructions and/or data, a display for displaying user interfaces, an input device for receiving inputs, an output device for generating outputs, a communications adapter for facilitating communications with other devices (e.g., the camera 104), and/or the like including combinations and/or multiples thereof.

The camera 104 captures one or more images, such as a panoramic image, of an environment. In examples, the camera 104 can be an ultra-wide angle camera 104. In an embodiment, the camera 104 includes a sensor 110 (FIG. 1B), that includes an array of photosensitive pixels. The sensor 110 is arranged to receive light from a lens 112. In the illustrated embodiment, the lens 112 is an ultra-wide angle lens that provides (in combination with the sensor 110) a field of view θ between 100 and 270 degrees, for example. In an embodiment, the field of view θ is greater than 180 degrees and less than 270 degrees about a vertical axis (e.g., substantially perpendicular to the floor or surface that the measurement device is located). It should be appreciated that while embodiments herein describe the lens 112 as a single lens, this is for example purposes and the lens 112 may be a comprised of a plurality of optical elements.

In an embodiment, the camera 104 includes a pair of sensors 110A, 110B that are arranged to receive light from ultra-wide angle lenses 112A, 112B respectively (FIG. 1C). In this example, the camera 104 can be referred to as a dual camera because it has a pair of sensors 110A, 110B and lenses 112A, 112B as shown. The sensor 110A and lens 112A are arranged to acquire images in a first direction, and the sensor 110B and lens 112B are arranged to acquire images in a second direction. In the illustrated embodiment, the second direction is opposite the first direction (e.g., 180 degrees apart). A camera having opposingly arranged sensors and lenses with at least 180 degree field of view are sometimes referred to as an omnidirectional camera, a 360 degree camera, or a panoramic camera as it acquires an image in a 360 degree volume about the camera.

Figure 1E:
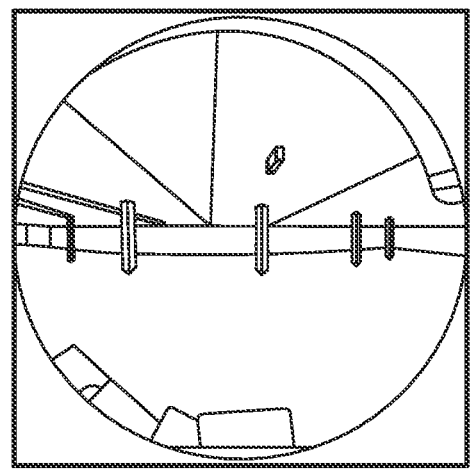
Figure 1D:
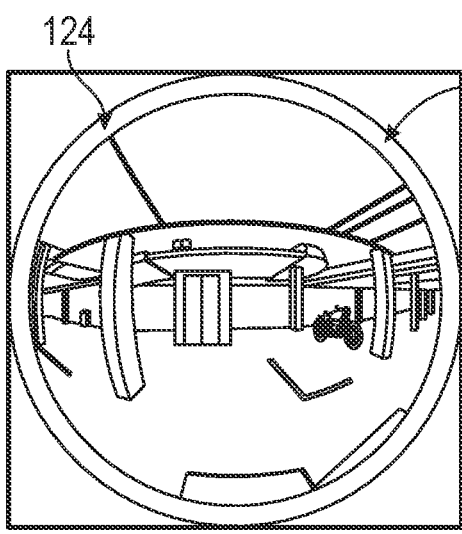
Figure 1E:
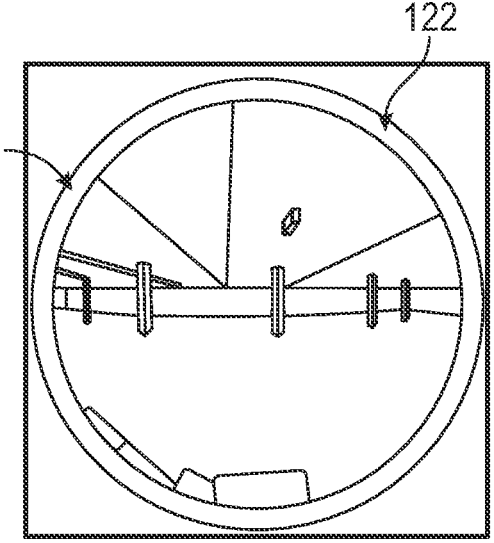
Figure 1F:
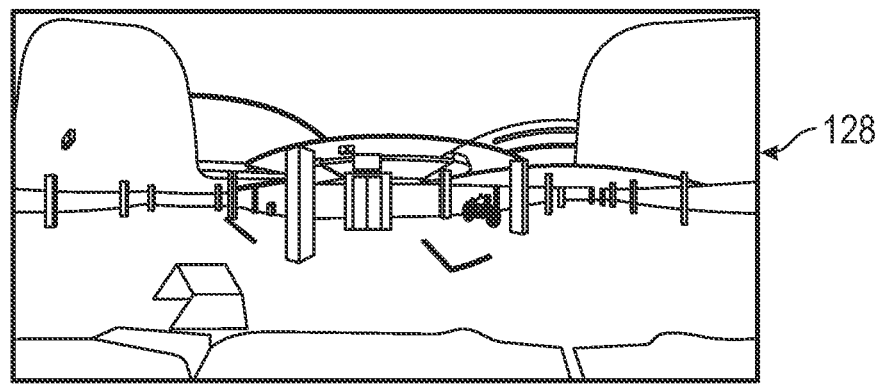
FIG. 1F is a merged image formed from the images of FIG. 1D and FIG. 1E in accordance with an embodiment according to one or more embodiments described herein.

FIGS. 1D and 1E depict images acquired by the dual camera of FIG. 1C, for example, and FIGS. 1D' and 1E' depict images acquired the dual camera of FIG. 1C where each of the images has a field of view greater than 180 degrees. It should be appreciated that when the field of view is greater than 180 degrees, there will be an overlap 120, 122 between the acquired images 124, 126 as shown in FIG. 1D' and FIG. 1E'. In some embodiments, the images may be combined to form a single image 128 of at least a substantial portion of the spherical volume about the camera 104 as shown in FIG. 1F.

Figure 2:
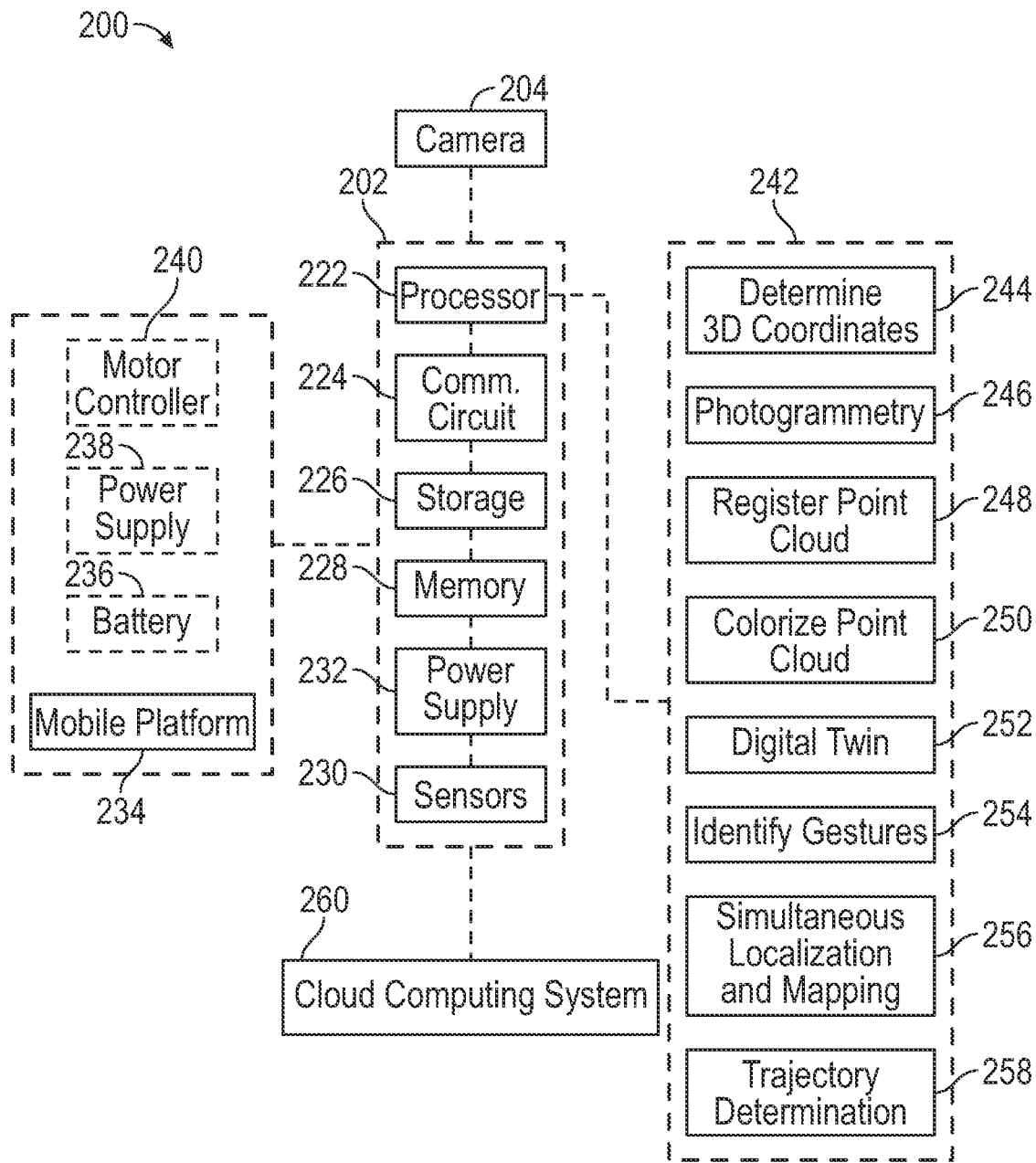
FIG. 2 is a schematic block diagram of a system to perform image localization using a digital twin representation of an environment according to one or more embodiments described herein.

Referring now to FIG. 2, a schematic illustration of a system 200 is shown according to one or more embodiments described herein. In an embodiment, the system 200 is the same as (or similar to) the system 100 of FIG. 1A. In particular, the system 200 can perform image localization using a digital twin representation of an environment. The system 200 includes a processing system 202 and a camera 204 according to one or more embodiments described herein. The camera 204, also referred to as an image acquisition system, can be an omnidirectional camera, a 360 degree camera, a panoramic camera that acquires an image in a 360 degree volume about the camera, and/or the like, including combinations and/or multiples thereof.

The processing system 202 and camera 204 are communicatively connected (i.e., communicatively coupled) together such that the camera 204 can send data (e.g., images) to the processing system 202, and the processing system 202 can send data (e.g., commands) to the camera 204. According to one or more embodiments described herein, the processing system 202 includes a processor 222 that provides for the operation of the system 200. In an embodiment, the processor 222 includes one or more processors that are responsive to executable computer instructions when executed on the one or more processors. It should be appreciated that one or more of the processors may be located remotely from the processing system 202. In an embodiment, the processor 222 uses distributed computing with some of the processing being performed by one or more nodes in a cloud-based computing environment and/or another suitable system/device. The processor 222 may accept instructions through a user interface (i.e., an input device), such as but not limited to a keyboard, a mouse, or a touch screen for example.

The processor 222 is capable of converting signals representative of system data received from the camera 204 and/or one or more sensors 230 of the processing system 202. The system data may include distance measurements and encoder signals that may be combined to determine three-dimensional coordinates on surfaces in the environment. Other system data may include images or pixel voltages from the camera 204. In general the processor 222 receives system data and is given certain instructions, which can cause one or more of generating a 3D coordinate, registering a plurality of coordinate systems, applying color to points in the point cloud, identifying retroreflective or reflective targets, identifying gestures, simultaneously localizing and generating a map of the environment, determining the trajectory of a measurement device, generating a digital twin representation of an object or environment, using a digital twin representation of an environment to perform image localization, and/or the like, including combinations and/or multiples thereof.

The processor 222 also provides operating signals to the camera 204. For example, the signals may initiate control methods that adapt the operation of the processing system 202 and/or the camera 204, such as causing the camera 204 to capture one or more images.

The processor 222 is coupled to one or more system components by data transmission media (e.g., twisted pair wiring, coaxial cable, fiber optical cable, wireless protocols, and/or the like). Data transmission media includes, but is not limited to, wireless, radio, and infrared signal transmission systems. In the embodiment of FIG. 2, data transmission media couples to the processor 222 to the camera 204, a communications circuit 224, a storage device 226 (e.g., nonvolatile memory), a memory 228 (e.g., random access memory or read-only memory), and one or more sensors 230.

The communications circuit 224 is operable to transmit and receive signals between the camera 204 and the processing system 202 and/or from external sources, including but not limited to nodes in a distributed or cloud-based computing environment. The communications circuit 224 may be configured to transmit and receive signals wirelessly (e.g. WiFi or Bluetooth), via a wired connection (e.g. Ethernet, Universal Serial Bus), or a combination thereof.

The storage device 226 is any form of non-volatile memory such as an EPROM (erasable programmable read only memory) chip, a disk drive, and/or the like, including combinations and/or multiples thereof. Stored in storage device 226 are various operational parameters for the application code. According to one or more embodiments described herein, the storage device 226 can store position data associated with each image captured by the camera 204. According to one or more embodiments described herein the storage device 226 can store images captured by a camera (not shown) of the processing system 202, position data associated with the images captured by the camera of the processing system 202, and/or position data of annotations made by a user to the images captured by the camera of the processing system 202.

In an embodiment, the sensors 230 may include a LIDAR sensor, an inertial measurement unit, an integral camera or cameras, and/or the like including combinations and/or multiples thereof. For example, the processing system 202 can also include a LIDAR sensor. As discussed in more detail herein, the LIDAR sensor (e.g., the sensor 230) can be configured to emit light from a light source, which is reflected off a surface in the environment, and the reflected light is received by a light receiver, such as a photosensitive array.

The processor 222 includes operation control methods embodied in application code, such as the methods described herein. These methods are embodied in computer instructions written to be executed by the one or more processors, typically in the form of software. The software can be encoded in any programming language. The processor 222 may further be electrically coupled to a power supply 232. The power supply 232 receives electrical power from a power source (e.g., a battery) and adapts the characteristics of the electrical power for use by the system 200.

In an embodiment, the system 200 may include a mobile platform 234. The mobile platform 234 may be any movable assembly capable of supporting the processing system 202 and/or the camera 204 during operation. As such, the mobile platform 234 can have wheels or articulated legs. In one or more embodiments, the mobile platform 234 may be, but is not limited to, a cart or a trolley for example. In other embodiments, the mobile platform 234 may be an airborne device, such as an unmanned aerial vehicle (UAV) or a drone for example. The mobile platform 234 may include a handle positioned for an operator to push or pull the mobile platform 234 through the environment where coordinates are to be acquired. In some embodiments, the mobile platform 234 may be autonomously or semi-autonomously operated. In this embodiment, the mobile platform 234 may include a power source/battery 236, a power supply 238, and a motor controller 240, although other configurations are also possible. In some examples, the mobile platform 234 is a tripod that can be positioned at and moved between different locations throughout an environment.

In an embodiment, the processor 222 is configured to execute one or more engines 242. In an embodiment, the engines 242 may be in the form of executable computer instructions that perform certain operational methods when executed on one or more processors. The engines 242 may be stored on the storage device 226 or the memory 228 for example. The engines 242, when executed on the processor 222, may receive inputs, such as from the one or more sensors 230 of the processing system 202 and/or from the camera 204, and transform data, generate data, and/or cause the processing system 202 and/or the camera 204 to perform an action. In an embodiment, the engines 242 include one or more of, but not limited to, a determine 3D coordinates engine 244, a photogrammetry engine 246, a register point cloud engine 248, a colorize point cloud engine 250, a digital twin engine 252, an identify gestures engine 254, a tracking engine 256, and a trajectory determination engine 258. It should be appreciated that, in examples, other engines can be utilized. For example, one or more of the engines 242 can be eliminated and/or one or more other engines can be added.

In an embodiment, the colorize point cloud engine 250 aligns the images acquired by the camera 204 with either the point cloud (from the register point cloud engine 248) or with the 3D points from individual scans. In either case, once aligned, the color values from the images may be mapped to the points and the color value assigned to the point. In this way, when the point cloud is displayed in color, the image will appear realistic.

In an embodiment, the photogrammetry engine 246 and the determine 3D coordinates engine 244 may cooperate to determine 3D coordinates of points on surfaces in the environment using the image(s) captured by the camera 204. In an embodiment, the register point cloud engine 248 may receive 3D coordinates from the engine 244 and register them into the same coordinate frame of reference based at least in part on image(s) acquired by the camera 204.

In an embodiment, the identify gestures engine 254 may receive an image from the omnidirectional camera 204. In respond to receiving the image, the engine 254 may perform image analysis to identify an operator within the image. Based at least in part on identifying the operator, the engine 254 may determine the operator is performing a gesture, such as by positioning their hands or their arms in a predetermined position (e.g. using a skeletal model). This predetermined position is compared with a table of operator positions and an associated control method is performed (e.g., measure 3D coordinates). In an embodiment, the identify gestures engine 254 operates in the manner described in commonly owned U.S. Pat. No. 8,537,371 entitled "Method and Apparatus for Using Gestures to Control a Laser Tracker", the contents of which are incorporated by reference herein.

In an embodiment, the processing system 202 and the omnidirectional camera 204 are moved through the environment, such as on the mobile platform 234 or by an operator in hand. In an embodiment, a plurality of images are acquired by the camera 204 while the mobile platform 234 is moved through the environment. These plurality of images may be used to generate a two-dimensional (2D) map of the environment using a method such as simultaneous localization and mapping (SLAM) for example. According to one or more embodiments described herein, the tracking engine 256 using SLAM techniques to track the processing system 202. In other examples, the tracking engine 256 tracks the processing system 202 based on data from the sensor 230 and/or based on images captured by a camera (not shown) integrated into the processing system 202.

The tracking engine 256 may cooperate with trajectory determination engine 258 to determine the trajectory (e.g., the 3D path) that the processing system 202 follows through the environment. In an embodiment, the determined trajectory is used by the register point cloud engine 248 to register the 3D coordinates in a common frame of reference.

According to one or more embodiments described herein, the processing system 202 can trigger the camera 204 to capture images. The triggering can be, for example, a manual triggering event (e.g., a user pressing a button on a touch screen of the processing system 202) and/or an automatic triggering event (e.g., every "X" seconds, every "X" distance, based on a predefined grid or predefined location, and/or the like, including combinations and/or multiples thereof).

According to one or more embodiments described herein, the processing system 202 can cause to be displayed, on a display (not shown) a trajectory (e.g., the trajectory from the trajectory determination engine 258, recorded 3D coordinate data (e.g., point cloud data), a confidence/completeness of the 3D coordinate data along with the 3D coordinate data, a mesh generation of the 3D coordinate data, an image trigger to cause multiple images to be captured, and/or the like including combinations and/or multiples thereof.

It should be appreciated that the camera 204 provides advantages to the engines 242 in allowing the control methods to be executed faster (e.g., less images are used) or perform methods that are not possible with traditional cameras with a narrower field of view.

The digital twin engine 252 uses images captured by the camera 204 and data captured by the processing system 202 (e.g., from a LIDAR sensor) to generate a digital twin representation of the environment through with the camera 204 and the processing system 202 are moved. The digital twin engine 252 uses the digital twin representation of the environment to perform image localization as described herein.

According to one or more embodiments described herein, the system 200 includes, or is in communication with, a cloud computing system 260. Cloud computing can supplement, support or replace some or all of the functionality of the elements of the system 200. For example, some or all of the functionality of the elements of system 200 can be implemented as a node of the cloud computing system 260. The cloud computing system 260, in examples, can perform additional functions not described with reference to the system 200.

Further features and functionality of the system 100 and/or the system 200 are now described with reference to FIGS. 3, 4A, 4B, 5A, and 5B.

Figure 3:
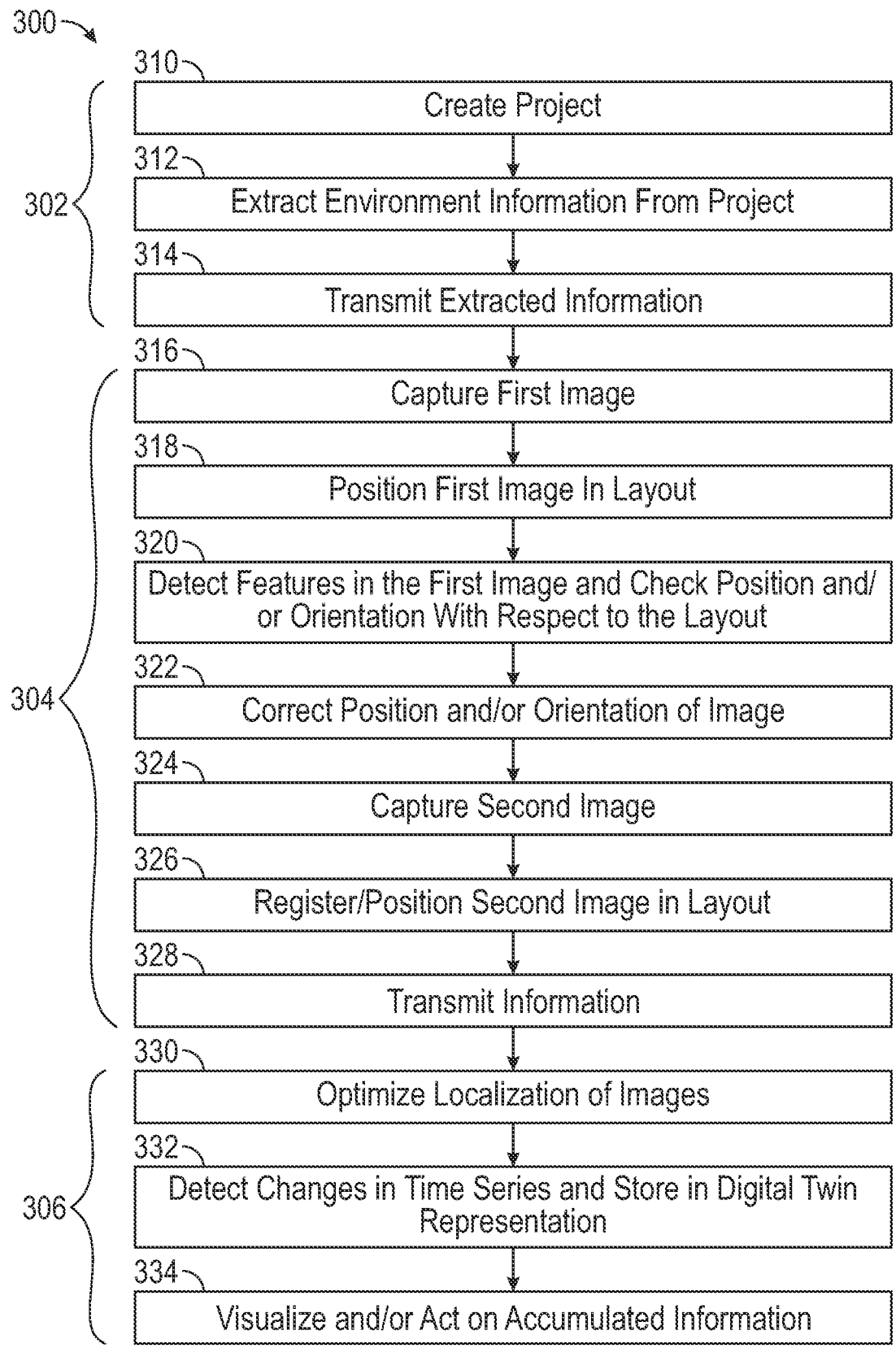
FIG. 3 is a flow diagram of a method for image localization using a digital twin representation of an environment according to one or more embodiments described herein.

Particularly, FIG. 3 depicts a flow diagram of a method 300 for image localization using a digital twin representation of an environment according to one or more embodiments described herein. The method 300 can be performed by any suitable system and/or device, including combinations thereof. For example, the method 300 can be performed by the system 100 (including the processing system 102 and the camera 104), by the system 200 (including the processing system 202 and the camera 204), and/or the like. According to one or more embodiments described herein, the method 300 is performed, in whole or in part, by a processing system (e.g., the processing system 102, the processing system 202) that is located remotely from the camera (e.g., the camera 104, the camera 204). For example, the processing system can be one or more nodes of the cloud computing system 260. According to one or more embodiments described herein, the method 300 is performed by a combination of a processing system (e.g., the processing system 102, the processing system 202), a camera (e.g., the camera 104, the camera 204), and a cloud computing system (e.g., the cloud computing system 260).

In the example of FIG. 3, the method 300 is generally segmented into three phases: a preparation phase 302, a capture phase 304, and an optimization phase 306. According to one or more embodiments described herein, the preparation phase 302 and the optimization phase 306 are performed by the cloud computing system 260 and the capture phase 304 is performed by one or more of the systems 100, 200 (e.g., (e.g., the processing system 102 and the camera 104, the processing system 202 and the camera 204). According to one or more embodiments described herein, each of the preparation phase 302, the capture phase 304, and the optimization phase 306 are performed by one or more of the systems 100, 200 (e.g., the processing system 102 and the camera 104, the processing system 202 and the camera 204). The method is now described in more detail with reference to the elements of FIG. 2 but is not so limited.

Figure 4A:
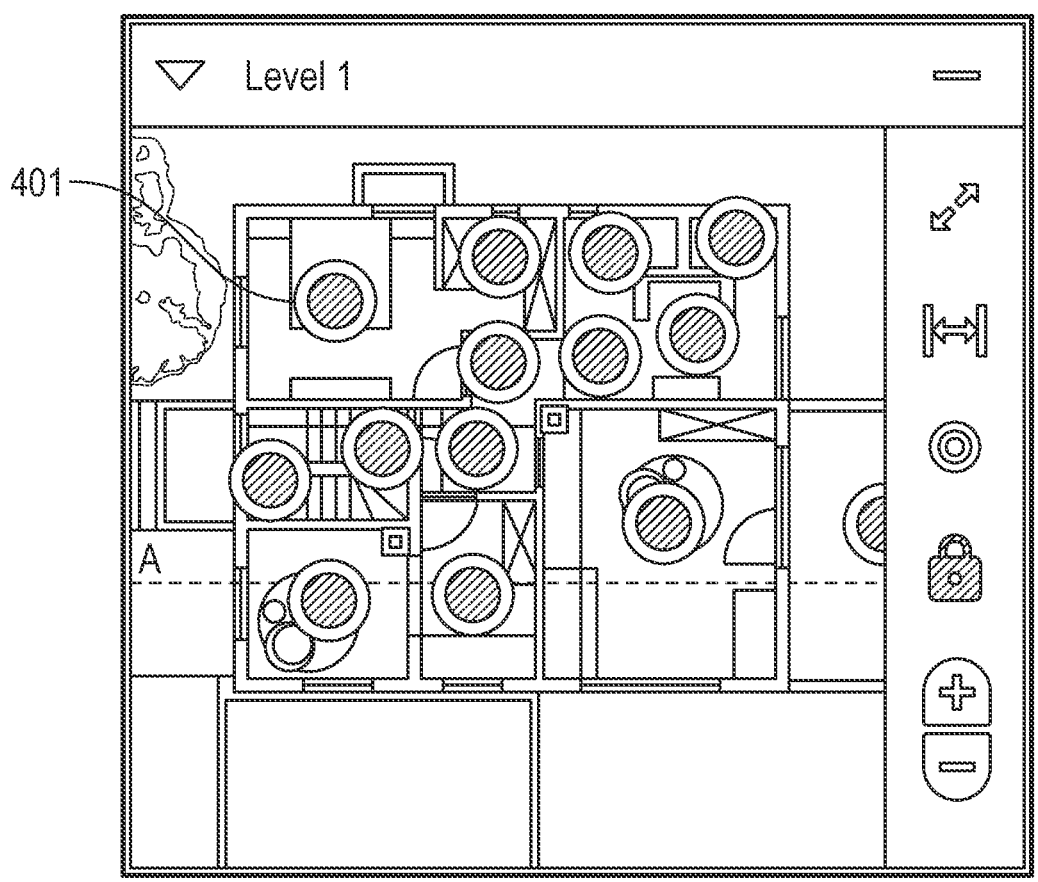
FIG. 4A depicts an example of a layout plan according to one or more embodiments described herein.

The preparation phase 302 begins at block 310, where a project is created. For example, a project is created using the cloud computing system 260. The project contains information about the environment to be captured. As an example, the information about the environment to be captured can include a model, such as a computer aided design (CAD) model, a building information modeling (BIM) model, and/or the like, including combinations and/or multiples thereof. FIG. 4A depicts an example of a layout plan 400 according to one or more embodiments described herein.

With continued reference to FIG. 3, at block 312, environment information is extracted from the project and/or from the model. For example, room dimensions, window size and position, door size and position, and/or the like, including combinations and/or multiples thereof is extracted from the CAD model or BIM model.

At block 316, the extracted information is transmitted, such as from the cloud computing system 260 to the processing system 202. The extracted information can be transmitted via any suitable wired and/or wireless link(s) using any suitable protocol(s). In examples, the extracted information is transmitted via a network (not shown), which represents any one or a combination of different types of suitable communications networks such as, for example, cable networks, public networks (e.g., the Internet), private networks, wireless networks, cellular networks, or any other suitable private and/or public networks. Further, the network can have any suitable communication range associated therewith and may include, for example, global networks (e.g., the Internet), metropolitan area networks (MANs), wide area networks (WANs), local area networks (LANs), or personal area networks (PANs). In addition, the network can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Figure 4B:
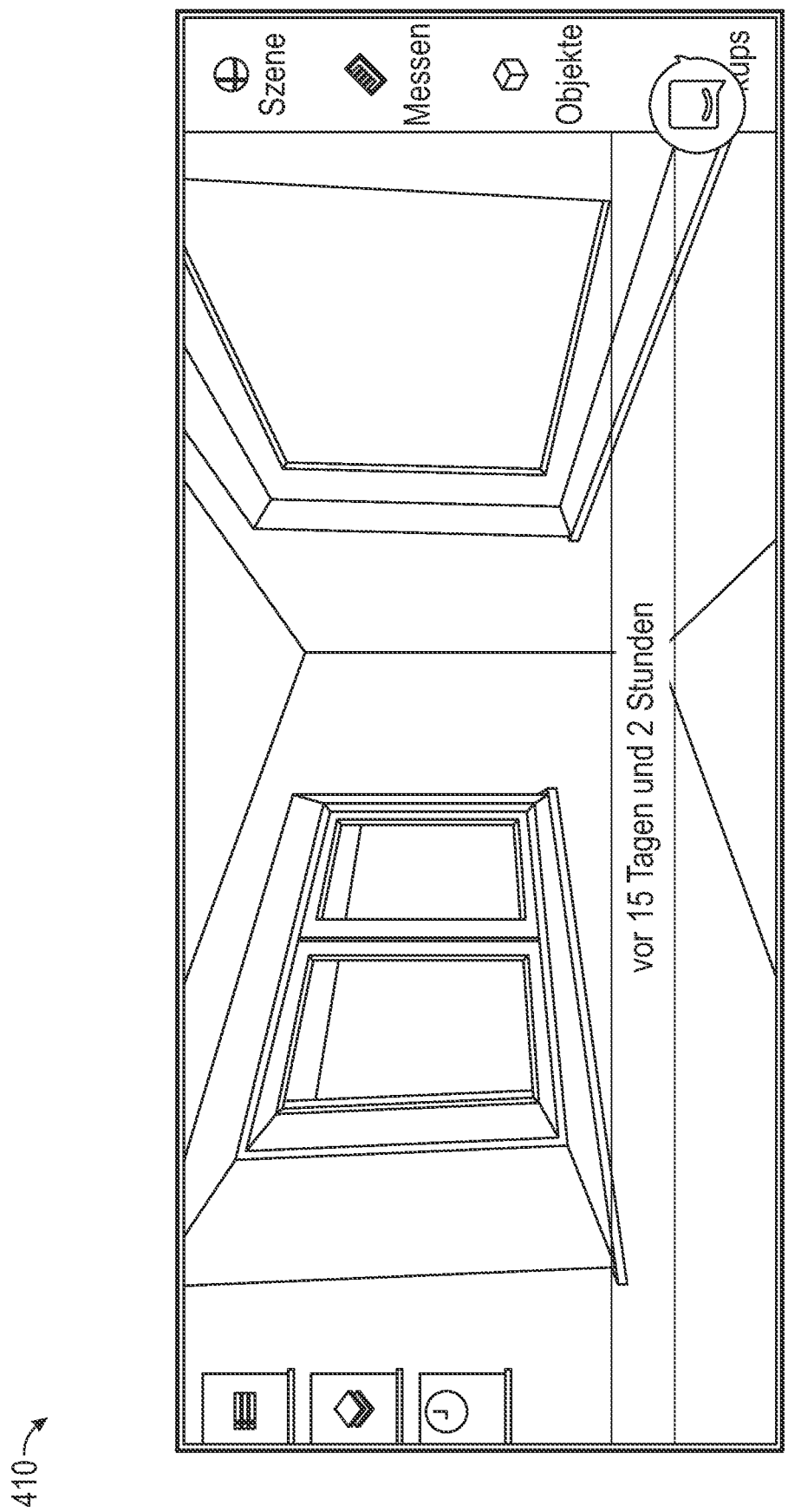
FIG. 4B depicts an image, which is an example of a first image according to one or more embodiments described herein.

The capture phase 304 begins at block 316, where a first image is captured. For example, the camera 204 captures a first image of an environment corresponding to the project created at block 310. The camera 204 can capture the first image based, for example, on an input received from a user, automatically based on a determined location of the camera 204, automatically based on a command from the processing system 202, and/or the like, including combinations and/or multiples thereof. As an example, the processing system 202 executes a software application (referred to as an "application") that displays, on a display, a user interface that, among other things, provides for a user to cause the camera 204 to capture the first image. For example, FIG. 4B depicts an image 410, which is an example of a first image according to one or more embodiments described herein.

With continued reference to FIG. 3, at block 318, the first image is positioned in the layout plan of the environment. For example, a user can select a location on the layout plan 400, and the first image 410 is then associated with (i.e., "positioned at") the selected location on the layout plan 400. For example, with reference to FIG. 4A, the user can select a location 401 on the layout plan 400, and the first image 410 is associated with the location 401. The location 401 represents the approximate location where the first image 410 was captured. According to one or more embodiments described herein, the first image 410 is located automatically on the layout plan 400, such as based on location metadata associated with the first image or other suitable information.

With continued reference to FIG. 3, at block 320, the processing system 202 detects features of the environment in the first image and checks position and/or orientation of the first image with respect to the layout plan. Examples of features of the environment can include, but are not limited to, windows, window openings, walls, doors, door openings, and/or the like, including combinations and/or multiples thereof. In the case of a window or other similar opening, the processing system 202 can detect the presence of the feature using brightness. For example, where the feature is a window, the processing system 202 can detect the feature (i.e., window) based on a first brightness value of a first pixel of the first image associated with the window. The processing system 202 can then compare the first brightness value of the first pixel of the first image to a second brightness value of a second pixel of the first image associated with other than the window. This enables the processing system 202 to detect the window. Different types of object recognition can be used to detect the window, for example, or any other suitable type of object. For example, object detection can be performed using a trained artificial intelligence model. Labeled training data showing objects to be detected (e.g., doors, windows, etc.) and corresponding labels can be used to train a neural network to detect and classify the objects, for example. This is referred to as supervised learning. As another example, an object such as a window can be detected based on a property within an image, such as a brightness level of a group of pixels in the case of a window and a shape of the group of pixels. In the case of a window, the pixels may have a substantially rectangular shape and a relatively brighter brightness level than neighboring or nearby pixels. The processing system 202 can compare the location of detected features with the environment information that extracted from the project and/or from the model at block 312.

Where features are detected in the first image and the layout plan, the features can be used to refine/correct the position of the first image in the layout plan at block 322. For example, the processing system 202 performs a second positioning at block 322 to correct the position and/or orientation of the first image based at least in part on the detected feature (from block 320) as compared to the extracted feature (from block 312) to refine the position of the first image in the digital layout plan of the environment.

At block 324, a second image of the environment is captured. For example, the camera 204 captures the second image of the environment corresponding to the project created at block 310.

At block 326, the processing system 202 can automatically register the image, if possible (e.g., if the second image is taken in close proximity to (e.g., within the same room as) the first image). As an example, features may be extracted from the second image and compared to the features extracted from the first image. The processing system 202 can automatically register/position the second image in the layout plan at block 326 where sufficient overlap exists between the first image and the second image. An example of sufficient overlap is where at least one common feature can be identified in the first image and the second image. Another example of sufficient overlap is where at least three common features can be identified in the first image and the second image. Where the processing system 202 cannot automatically register the second image, a user can manually locate the second image in the layout plan as described herein.

At block 328, the processing system 202 transmits information (e.g., the first and second images, locations for the first and second images) to the cloud computing system 260. The transmission can be performed using one or more of the techniques described herein, and/or the like.

The cloud computing system 260 can then perform the optimization phase 306, which begins at block 330. Particularly, at block 330, the cloud computing system 206 optimizes the location of the first and second images. Once a feature (or "object", such as a window) is detected, as described herein, the feature can be used to align an image (e.g., one or more of the first and second images), which can be a panoramic image, in orientation to the layout plan. The position and orientation of the detected feature in the layout plan is known and therefore the rotation of the image can be calculated and applied. A similar approach can be applied for detecting multiple features and using intersection of line of sight to align the image(s).

At block 332, the cloud computing system 260 detects changes in time series. Such changes can be detected based on metadata associated with the first and second images (as compared to other images stored in or accessible by the cloud computing system 260), changes to the environment as determined by comparing the first and second images with prior images, etc. For example the cloud computing system 260 can perform construction progress detection to detect changes during construction, danger detection to detect dangerous condition, damage detection to detect damage to the environment and/or objects within the environment, and/or the like, including combinations and/or multiples thereof.

Figure 5A:
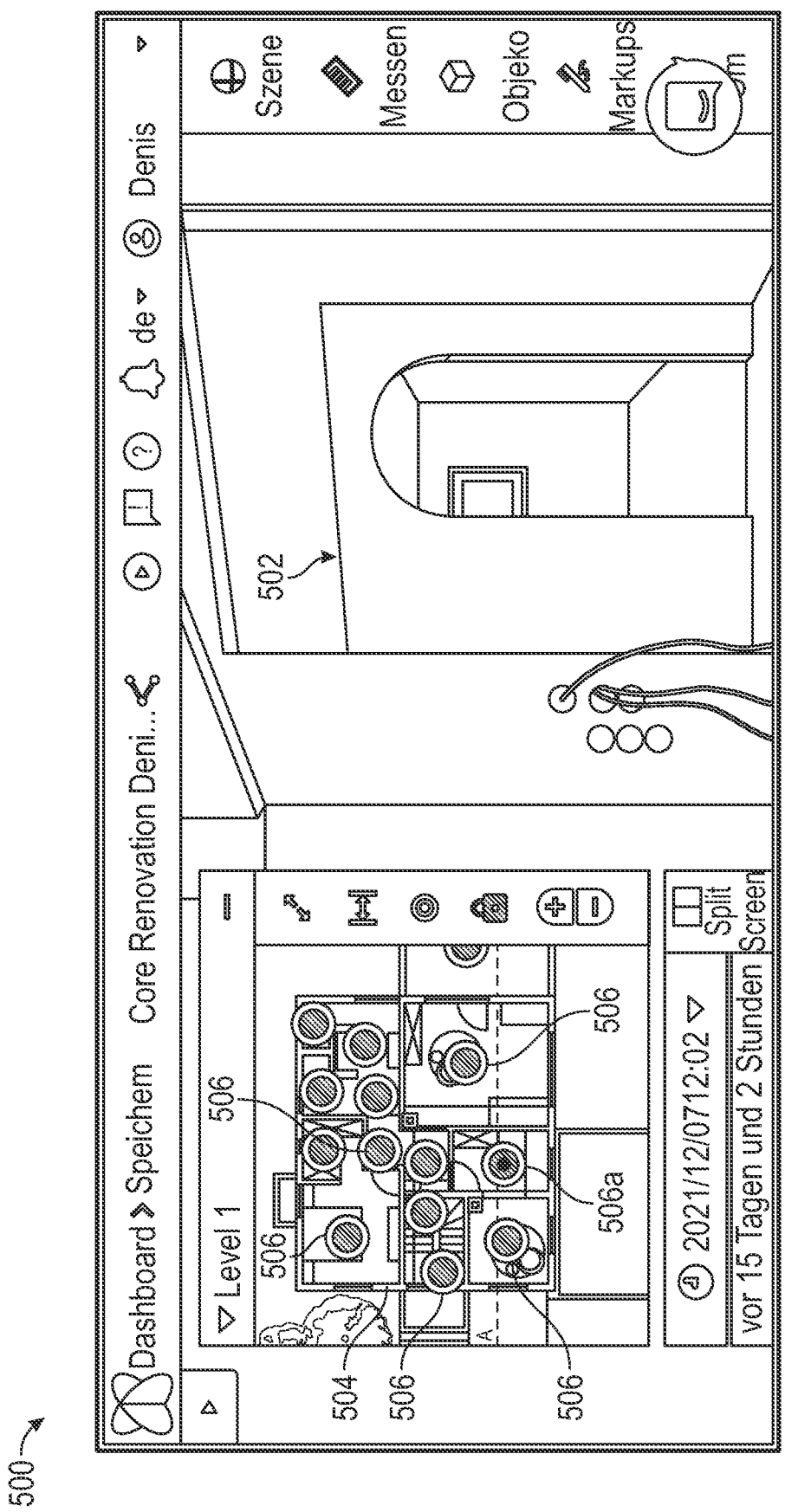
FIGS. 5A and 5B depict example digital twin representations of an environment according to one or more embodiments described herein.
Figure 5B:
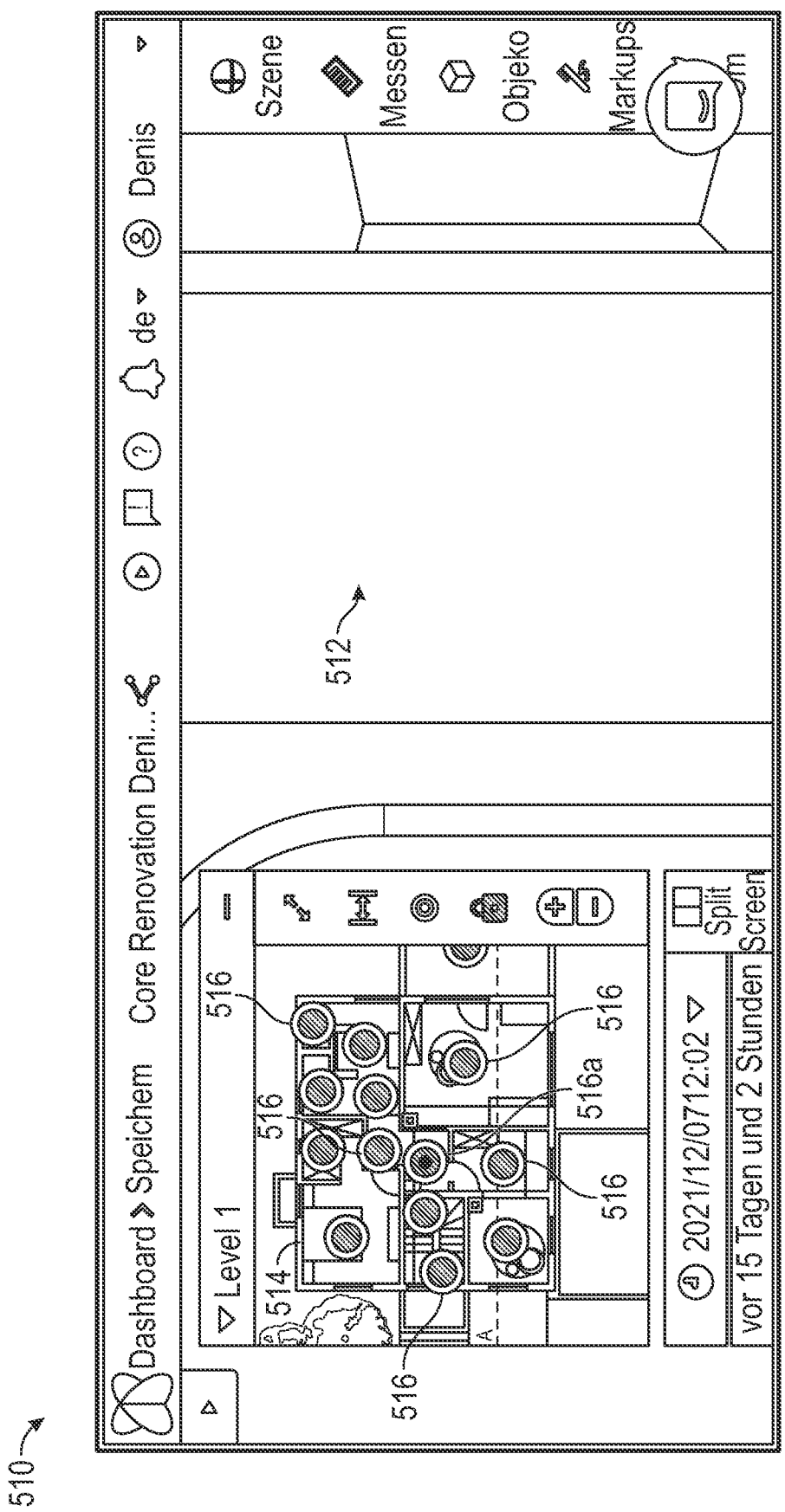

At block 334, the cloud computing system 260 can generates a digital twin representation of the environment using the layout plan and the first and second images (and/or additional images). The cloud computing system 260 can transmit the digital twin representation to the processing system 202, which can display the digital twin representation on a display (not shown). FIGS. 5A and 5B depict example digital twin representations 500, 510 of an environment according to one or more embodiments described herein. In the example of FIG. 5A, the digital twin representation 510 includes an image 512 and a layout plan 514 overlaid on the image 512. The layout plan 514 includes indicia that represent locations having associated images, such as the image 512. For example, the indicia 516a has associated therewith the image 512. Similarly, in the example of FIG. 5B, the digital twin representation 510 includes an image 512 and a layout plan 514 overlaid on the image 512. The layout plan 514 includes indicia that represent locations having associated images, such as the image 512. For example, the indicia 516a has associated therewith the image 512.

With continued reference to FIG. 3, additional processes also may be included, and it should be understood that the process depicted in FIG. 3 represents an illustration, and that other processes may be added or existing processes may be removed, modified, or rearranged without departing from the scope of the present disclosure. For example, the processing system 202 and/or the cloud computing system 260 can implement machine learning techniques to detect features (see, e.g., block 320). One or more embodiments described herein can utilize machine learning techniques to perform tasks, such as detect features in an image. More specifically, one or more embodiments described herein can incorporate and utilize rule-based decision making and artificial intelligence (AI) reasoning to accomplish the various operations described herein, namely detecting features in an image. The phrase "machine learning" broadly describes a function of electronic systems that learn from data. A machine learning system, engine, or module can include a trainable machine learning algorithm that can be trained, such as in an external cloud environment, to learn currently unknown functional relationships between inputs and outputs, and the resulting model (sometimes referred to as a "trained neural network," "trained model," and/or "trained machine learning model") can be used for detecting features in images, for example. In one or more embodiments, machine learning functionality can be implemented using an artificial neural network (ANN) having the capability to be trained to learn currently unknown functional relationships. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP).

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of detecting features in images as described herein.

Figure 6:
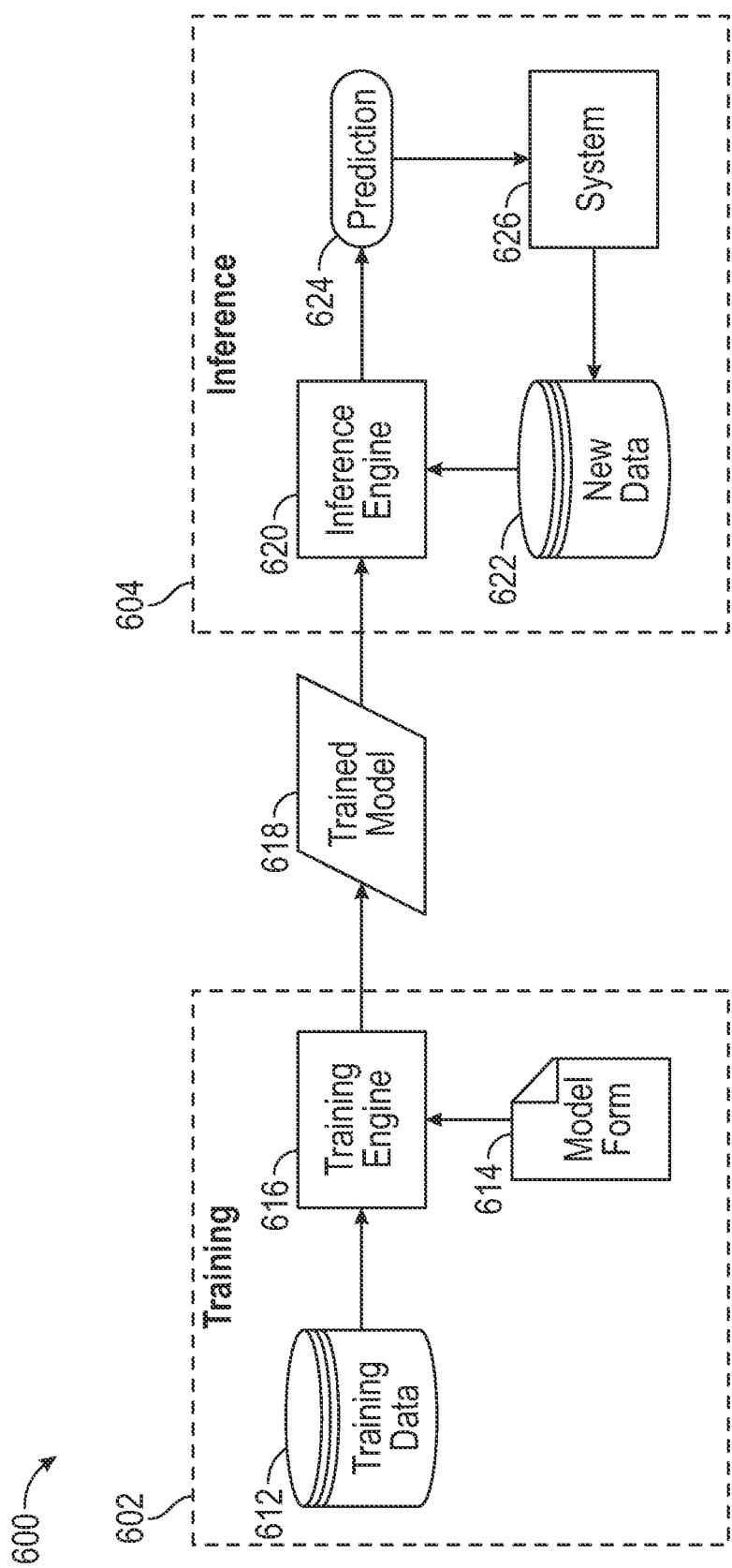
FIG. 6 depicts a block diagram of components of a machine learning training and inference system according to one or more embodiments described herein.

Systems for training and using a machine learning model are now described in more detail with reference to FIG. 6. Particularly, FIG. 6 depicts a block diagram of components of a machine learning training and inference system 600 according to one or more embodiments described herein. The system 600 performs training 602 and inference 604. During training 602, a training engine 616 trains a model (e.g., the trained model 618) to perform a task, such as to detect features in images. Inference 604 is the process of implementing the trained model 618 to perform the task, such as to detect features in images, in the context of a larger system (e.g., a system 626). All or a portion of the system 600 shown in FIG. 6 can be implemented, for example by all or a subset of the cloud computing system 260 of FIG. 2 and/or the processing systems 102, 202 of FIGS. 1, 2 respectively.

The training 602 begins with training data 612, which may be structured or unstructured data. According to one or more embodiments described herein, the training data 612 includes labeled images of features (e.g., doors, door openings, windows, window openings, and/or the like, including combinations and/or multiples thereof). The training engine 616 receives the training data 612 and a model form 614. The model form 614 represents a base model that is untrained. The model form 614 can have preset weights and biases, which can be adjusted during training. It should be appreciated that the model form 614 can be selected from many different model forms depending on the task to be performed. For example, where the training 602 is to train a model to perform image classification, the model form 614 may be a model form of a CNN. The training 602 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 612 includes labeled images, including images of the object of interest with associated labels (ground truth) and other images that do not include the object of interest with associated labels. In this example, the training engine 616 takes as input a training image from the training data 612, makes a prediction for classifying the image, and compares the prediction to the known label. The training engine 616 then adjusts weights and/or biases of the model based on results of the comparison, such as by using backpropagation. The training 602 may be performed multiple times (referred to as "epochs") until a suitable model is trained (e.g., the trained model 618).

Once trained, the trained model 618 can be used to perform inference 604 to perform a task, such as to detect features in images. The inference engine 620 applies the trained model 618 to new data 622 (e.g., real-world, non-training data). For example, if the trained model 618 is trained to classify images of a particular object, such as a chair, the new data 622 can be an image of a chair that was not part of the training data 612. In this way, the new data 622 represents data to which the model 618 has not been exposed. The inference engine 620 makes a prediction 624 (e.g., a classification of an object in an image of the new data 622) and passes the prediction 624 to the system 626 (e.g., the processing system 202 of FIG. 2, the cloud computing system 260 of FIG. 2, and/or the like, including combinations and/or multiples thereof). The system 626 can, based on the prediction 624, taken an action, perform an operation, perform an analysis, and/or the like, including combinations and/or multiples thereof. In some embodiments, the system 626 can add to and/or modify the new data 622 based on the prediction 624.

In accordance with one or more embodiments, the predictions 624 generated by the inference engine 620 are periodically monitored and verified to ensure that the inference engine 620 is operating as expected. Based on the verification, additional training 602 may occur using the trained model 618 as the starting point. The additional training 602 may include all or a subset of the original training data 612 and/or new training data 612. In accordance with one or more embodiments, the training 602 includes updating the trained model 618 to account for changes in expected input data.

The term "about" is intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A method comprising:
   capturing, using a camera, a first image of an environment, the camera being communicatively connected to a processing system;
   performing, by the processing system, a first positioning to establish a position of the first image in a layout plan of the environment;
   detecting, by the processing system, a feature in the first image;
   performing, by the processing system, a second positioning based at least in part on the feature to refine the position of the first image in the layout plan of the environment;
   capturing, using the camera, a second image of the environment;
   automatically registering the second image to the layout plan; and
   generating a digital twin representation of the environment using the first image based at least in part on the refined position of the first image in the layout plan of the environment and using the second image.

2. The method of claim 1, wherein the camera is a 360 degree image acquisition system.

3. The method of claim 2, wherein the 360 degree image acquisition system comprises:

a first photosensitive array operably coupled to a first lens, the first lens having a first optical axis in a first direction, the first lens providing a first field of view greater than 180 degrees;

a second photosensitive array operably coupled to a second lens, the second lens having a second optical axis in a second direction, the second direction is opposite the first direction, the second lens providing a second field of view greater than 180 degrees; and wherein the first field of view at least partially overlaps with the second field of view.

4. The method of claim 3, wherein the first optical axis and second optical axis are coaxial.

5. The method of claim 3, wherein the first photosensitive array is positioned adjacent the second photosensitive array.

6. The method of claim 1, wherein the processing system triggers the camera to capture the first image with a trigger event.

7. The method of claim 6, wherein the trigger event is an automatic trigger event or a manual trigger event.

8. The method of claim 7, wherein the automatic trigger event is based on a location of the processing system, is based on a location of the camera, is based on an elapsed distance, or is based on an elapsed time.

9. The method of claim 1, wherein the first image is a first panoramic image.

10. The method of claim 9, wherein the first image is a 360 degree image.

11. The method of claim 1, wherein the feature is selected from the group consisting of a wall, a window, a door, and a door opening.

12. The method of claim 1, wherein the feature is a window, and wherein the window is detected based on a first brightness value of a first pixel of the first image associated with the window compared to a second brightness value of a second pixel of the first image associated with other than the window.

13. The method of claim 1, wherein detecting the feature is performed using a trained machine learning model.

14. The method of claim 13, wherein the trained machine learning model is a convolutional neural network trained to classify features in images.

15. The method of claim 1, further comprising, prior to capturing the first image:
creating a project for the environment, wherein the project includes the layout plan; and
extracting information about the environment based at least in part on the layout plan.

16. The method of claim 1, further comprising, prior to generating the digital twin representation of the environment:
optimizing localization of the first image and the second image; and
detecting a change to a time series and associating the change to the time series with the digital twin representation.

17. A system comprising:
a camera to capture images of an environment; and
a processing system communicatively coupled to the camera, the processing system comprising:
a memory comprising computer readable instructions; and
a processing device for executing the computer readable instructions, the computer readable instructions controlling the processing device to perform operations comprising:
causing the camera to capture a first image of the environment;
performing a first positioning to establish a position of the first image in a layout plan of the environment;
detecting a feature in the first image;
performing a second positioning based at least in part on the feature to refine the position of the first image in the layout plan of the environment; and
generating a digital twin representation of the environment using the first image based at least in part on the refined position of the first image in the layout plan of the environment.

18. The system of claim 17, wherein the operations further comprise:
causing the camera to capture a second image of the environment; and
automatically registering the second image to the layout plan,
wherein the digital twin representation of the environment is generated further using the second image of the environment.

19. The system of claim 18, further comprising a cloud computing system to:
create a project for the environment, wherein the project includes the layout plan;
extract information about the environment based at least in part on the layout plan;
optimize localization of the first image and the second image; and
detect a change to a time series and associating the change to the time series with the digital twin representation.

20. The system of claim 17, wherein detecting the feature is performed using a trained machine learning model, and wherein the trained machine learning model is a convolutional neural network trained to classify features in the images.

* * * * *